(12) United States Patent
Tuken et al.

(10) Patent No.: US 7,194,392 B2
(45) Date of Patent: Mar. 20, 2007

(54) SYSTEM FOR ESTIMATING MODEL PARAMETERS

(76) Inventors: Taner Tuken, 901 Maplewood Dr., Apt. 7, Cedar Falls, IA (US) 50613; David M. Carey, 6621 Sioux La., Lino Lakes, MN (US) 55014

( * ) Notice: Subject to any disclaimer, the term of this patent is extended or adjusted under 35 U.S.C. 154(b) by 552 days.

(21) Appl. No.: 10/691,766

(22) Filed: Oct. 23, 2003

(65) Prior Publication Data
US 2005/0091294 A1    Apr. 28, 2005

(51) Int. Cl.
G06F 17/10 (2006.01)
G06G 7/48 (2006.01)

(52) U.S. Cl. ............................ 703/2; 703/8; 701/104
(58) Field of Classification Search ............ 703/2, 703/7, 8; 705/7, 8; 701/3, 102, 103, 104, 701/106, 99; 123/299, 491, 492
See application file for complete search history.

(56) References Cited

U.S. PATENT DOCUMENTS

| 4,269,061 A | | 5/1981 | Hatsuno et al. ............. 73/40 |
| 5,020,362 A | | 6/1991 | Hart et al. ................ 73/119 A |
| 5,270,935 A | * | 12/1993 | Dudek et al. .............. 701/99 |
| 5,293,553 A | * | 3/1994 | Dudek et al. .............. 701/102 |
| 5,369,984 A | | 12/1994 | Rogers et al. ............. 73/49.2 |
| 5,394,331 A | * | 2/1995 | Dudek et al. ............. 701/106 |
| 5,715,796 A | * | 2/1998 | Suzuki et al. ............. 123/492 |
| 5,781,875 A | | 7/1998 | Maki et al. .............. 701/104 |
| 5,839,415 A | * | 11/1998 | Suzuki et al. ............. 123/491 |
| 5,930,762 A | * | 7/1999 | Masch ..................... 705/7 |
| 6,073,073 A | | 6/2000 | Kitamura et al. .......... 701/103 |
| 6,192,311 B1 | | 2/2001 | Yasui et al. .............. 701/113 |
| 6,327,850 B1 | | 12/2001 | Yasui et al. .............. 60/285 |
| 6,341,247 B1 | * | 1/2002 | Hreha et al. ............. 701/3 |
| 6,353,791 B1 | | 3/2002 | Tuken et al. ............. 701/114 |
| 6,363,316 B1 | | 3/2002 | Soliman et al. ........... 701/104 |
| 6,363,317 B1 | | 3/2002 | Druzhinina et al. ....... 701/104 |
| 6,363,318 B1 | | 3/2002 | Wang et al. ............. 701/110 |
| 6,370,473 B1 | | 4/2002 | Yasui et al. ............. 701/109 |
| 6,823,834 B2 | * | 11/2004 | Benson et al. ........... 123/299 |

OTHER PUBLICATIONS

Akin et al., H.L. Rule-Based Fuzzy Logic Controller for a PWR-Type Nuclear Power Plant, IEEE Transactions on Nuclear Science, vol. 38, No. 2, Apr. 1991, pp. 883-890.*

* cited by examiner

Primary Examiner—Russell Frejd
(74) Attorney, Agent, or Firm—Barnes & Thornburg LLP (57) ABSTRACT

A system for estimating on-line a set of mathematical model parameters is disclosed. The system includes a control circuit and a number of sensors electrically coupled to the control circuit. The control circuit is configured to update a group of matrix cells of a data matrix in response to receiving sensory data from the number of sensors and determine the model parameters based on the updated data matrix.

46 Claims, 4 Drawing Sheets

SYSTEM FOR ESTIMATING MODEL PARAMETERS

FIELD OF THE DISCLOSURE

This disclosure relates generally to systems for estimating a set of parameters of a mathematical model, and more specifically to systems for estimating on-line a set of parameters of a mathematical model.

BACKGROUND OF THE DISCLOSURE

A mathematical model is an equation or collection of equations which is typically used to mathematically describe a physical event or other phenomenon. In some implementations, the mathematical model may be used as a prediction tool. For example, the mathematical model may be used to predict an outcome (i.e. model output or outputs) given a set of known inputs (i.e. model input or inputs). A mathematical model may include one or more parameters which are used in the model to weight one or more model inputs and/or establish a model offset. The model parameters may be estimated or otherwise determined by a model parameter estimation system.

In applications in which the model parameters vary or drift over time due to, for example, changing model inputs and outputs or in which the model parameters differ from component-to-component, an on-line and continual model parameter estimation system provides improved performance and improved model accuracy. Such a system estimates the parameters of the model based on continuously or semi-continuously received, updated, or calculated model inputs and outputs.

SUMMARY OF THE DISCLOSURE

The present invention may comprise one or more of the following features or combinations thereof. A system for estimating a set of mathematical model parameters may include a number of sensors configured to produce sensory data and a control circuit electrically coupled to the number of sensors and periodically updating a group of matrix cells of a data matrix in response to receiving the sensory data. The control circuit is configured to determine the group of data matrix cells based on the values of the sensory data and to determine the set of mathematical model parameters based on the updated data matrix thereafter.

A method for estimating a set of mathematical model parameters may include the steps of receiving sensory data from a number of data sensors, selecting a group of matrix cells of a data matrix based on values of the sensory data in response to the receiving step, updating the selected group of matrix cells of the data matrix based on the sensory data, and determining the set of mathematical model parameters based on the updated data matrix.

In an alternative embodiment, a method for estimating a set of fuel quantity estimation model parameters may include the steps of receiving sensory data from a number of data sensors, selecting a row of a data matrix based on values of the sensory data in response to the receiving step, updating the selected row of the data matrix based on the sensory data, and determining the set of mathematical model parameters based on the updated data matrix using a least squares regression algorithm.

These and other objects of the present invention will become more apparent from the following description of the illustrative embodiments.

DESCRIPTION OF THE ILLUSTRATIVE EMBODIMENTS

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended.

Figure 1:
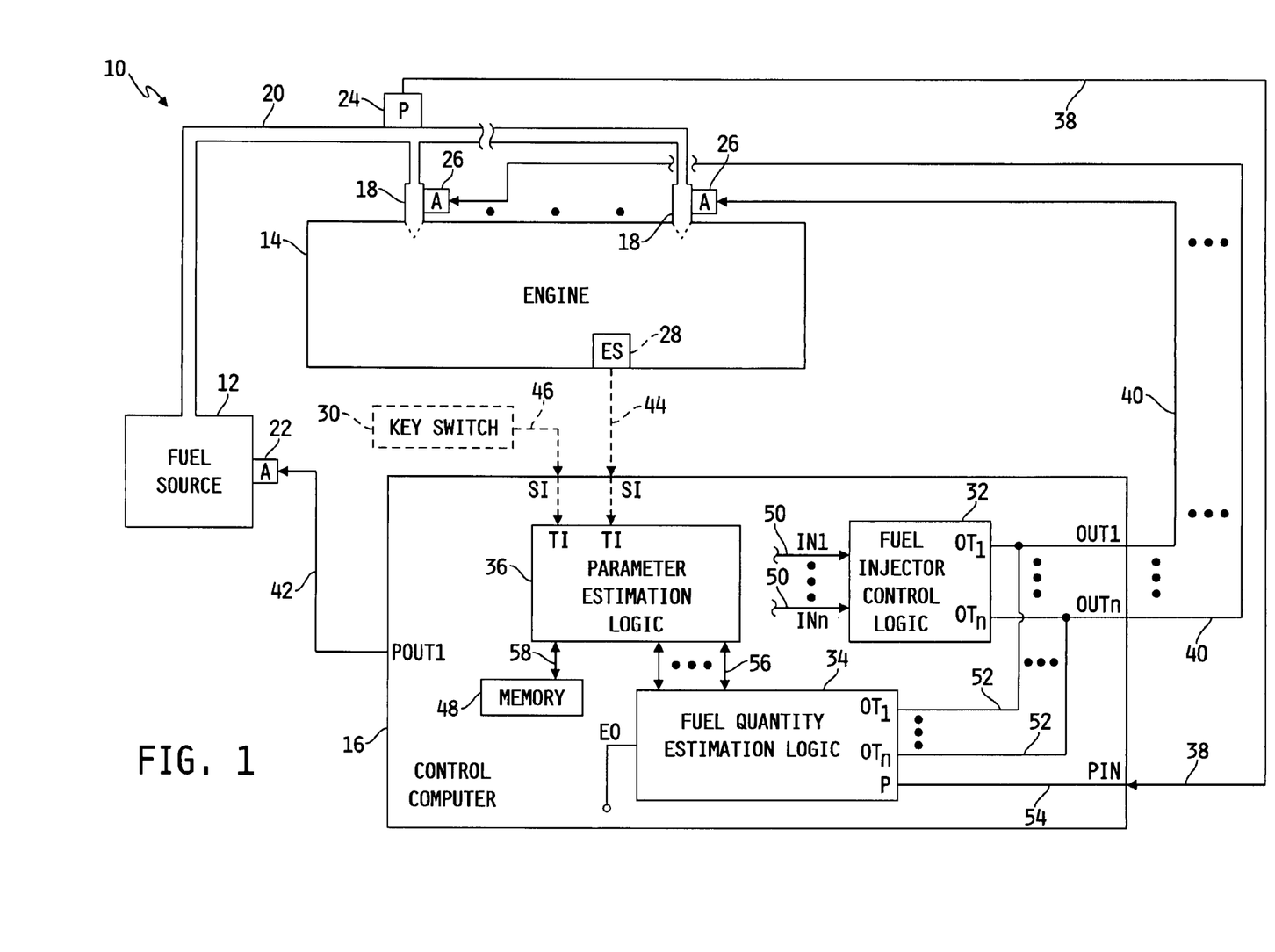
FIG. 1 is a diagrammatic illustration of one embodiment of an on-line system for estimating a set of mathematical model parameters.

Referring now to FIG. 1, a diagram of one illustrative embodiment of a system 10 for estimating online a set of mathematical model parameters is shown. The estimation system embodiment shown in FIG. 1 is implemented in the context of a fuel quantity estimation system such as the system described in U.S. patent application Ser. No. 10/417,829, now U.S. Pat No. 6,823,834 entitled SYSTEM FOR ESTIMATING AUXILIARY-INJECTED FUELING QUANTITIES, which is assigned to the assignee of the present invention, and the disclosure of which is incorporated herein by reference. However, it will be appreciated that this implementation represents only one illustrative system for estimating online a set of mathematical model parameters that is provided by way of example, and that the concepts illustrated and described herein are applicable to other model-based systems. Any such other model-based system utilizing the concepts illustrated and described herein are intended to fall within the scope of the claims appended hereto.

The system 10 includes a fuel source 12; e.g. diesel engine fuel, an internal combustion engine 14, and a control computer 16. The fuel source 12 includes devices, such as a fuel reservoir and a fuel pump, configured to supply pressurized fuel to a number of fuel injectors 18 via a fuel collection unit 20. Although the fuel collection unit 20 illustrated in FIG. 1 is a so called fuel "rail" system, the collection unit 20 may be embodied as any fuel collection unit, such as a fuel accumulator or other fuel storage unit, capable of supplying pressurized fuel to the injectors 18. In typical applications, a dedicated fuel injector is provided for each of a number of cylinders of the engine 14.

Fueling of the engine 14 is controlled by the control computer 16. In one embodiment, the control computer 16 is a control computer of known construction, wherein such a control computer 16 is typically referred to by those skilled in the art as an electronic (or engine) control module (ECM), engine control unit (ECU), or the like, although it is contemplated that the control computer 16 may alternatively be any circuit capable of performing the functions described hereinafter with respect to the control computer 16. In any case, the control computer 16, is operable, at least in part, to control the fueling of the engine 14 in accordance with one or more software algorithms stored within a memory device 48 of the control computer 16.

The control computer 16 controls the fueling of the engine 14 based on information provided by a number of sensors and/or sensor subsystems. Although only a selection of sensors is shown in FIG. 1, it should be understood that system 10 may include any number of sensors and sensor subsystems. Additionally, the sensors may include physical sensors such as temperature, pressure sensors, or the like, and/or "virtual" sensors in the form of one or more software algorithms configured to estimate one or more engine or system operating parameters as a function of one or more other engine and/or system operating parameters. The sensors produce sensory data and, in the case of virtual sensors, produce sensory data which may include calculated, estimated, or otherwise determined values. Accordingly, as used herein, the terms sensor and sensory data should not be restricted to physical sensors and signals produced thereby, but instead should be construed to include virtual sensors and associated virtual sensor information provided thereby.

The system 10 illustrated in FIG. 1 includes a fuel collection unit pressure sensor 24 electrically connected to an input PIN of the control computer 16 via signal path 38. Sensor 24 may be a known sensor operable to sense the pressure of the volume of pressurized fuel within the fuel collection unit 20. The system 10 may also include a number of engine sensors 28 such as engine speed sensors, engine position sensors, engine temperature sensors, coolant temperature sensors, engine pressure sensors, and other types of engine sensors operable to sense an operating condition of the engine 14. Such engine sensors 28 may be electrically connected to one or more of a number of sensor inputs SI of the control computer 16 via a number of signal paths 44. Additionally, system 10 may include other sensors external to the engine 14 such as key switch sensor 30 which is operable to sense an ignition signal produced by the operation of a vehicle operators key. Such external sensors may be electrically coupled to one or more of the sensor inputs SI of the control computer 16 via a number of signal paths 46.

The control computer 16 includes a number of outputs by which certain components of the system 10 may be electronically controlled. For example, outputs OUT1 through OUTn of the control computer 16 are electrically connected to a number of injector actuators 26, each of which is individually coupled to one of the injectors 18, via a number of signal paths 40. Actuators 26 are responsive to a fuel command or injector on-time signal produced by the control computer 16 on the signal paths 40 to dispense a quantity of fuel from the fuel collection unit 20 into a combustion chamber of the engine 14. In addition, output POUT1 of the control computer 16 is electrically connected to a fuel source pump actuator 22 of fuel source 12 via a signal path 42. Actuator 22 is responsive to a command signal produced by the control computer 16 on signal path 42 to cause a fuel source pump (not shown) of fuel source 12 to supply fuel from the fuel source 12 to the fuel collection unit 20.

The control computer 16 also includes a number of logic circuits including a fuel injector control logic circuit 32, a fuel quantity estimation logic circuit 34, and a parameter estimation logic circuit 36 as illustrated in FIG. 1. The fuel injector control logic circuit 32 includes a number of inputs, IN1 through INn, receiving input signals such as control, communication, and data signals from other internal logic circuits of the control computer 16 or from various external sources via a number of signal paths 50. The fuel injector control logic circuit 32 produces fuel commands or injector on-time commands on a number of outputs, OT1 through OTn, which are electrically connected to the outputs, OUT1 through OUTn, of the control circuit 16.

The fuel quantity estimation logic circuit 34 includes a number of inputs, OT1 through OTn, receiving input signals indicative of the on-time of the injectors 18 via a number of signal paths 52 that are electrically connected to the outputs, OT1 through OTn, respectively, of the fuel injector control logic circuit 32. The logic circuit 34 also includes a pressure input, P, electrically coupled to the input PIN of the control computer 16 via signal path 54 and receiving a signal or signals indicative of the pressure of the fuel collection unit 20. The logic circuit 34 produces an output signal indicative of an estimated fuel quantity on an output, EO. The output EO of the logic circuit 34 may be used by other circuitry internal and/or external to the control computer 16. Although the logic circuit 34 is illustrated in FIG. 1 with exemplary inputs and output, the fuel quantity estimation logical circuit 34 may include other and/or additional inputs and outputs according to the particular application.

The parameter estimation logic circuit 36 is electrically coupled to the fuel estimation logic circuit 34 via a number of signal paths or signal bus 56. The logic circuits 34, 36 communicate by sending and receiving data signals to and from one another via the paths 56. For example, in the embodiment illustrated in FIG. 1, the logic circuit 34 transmits the input signals received at the inputs OT1 through OTn and P to the parameter estimation logic circuit 34 via the signal paths 56. Alternatively, in other embodiments, the parameter estimation logic circuit 34 may include dedicated inputs electrically connected to the outputs, OT1 through OTn, of the fuel injector control logic circuit 32 and the input PIN of the control computer 16. The parameter estimation logic circuit 34 is also electrically connected to the memory device 48 via signal wires 58.

In some embodiments, the parameter estimation logic circuit 34 includes at least one trigger input TI configured to receive a trigger input signal. For example, the input TI may be electrically coupled to the key switch 30 and receive a trigger input signal when the key switch 30 is activated. In other embodiments, the input TI may be electrically coupled to one or more of the engine sensors 28 and receive a trigger input signal indicative of an operating condition of the engine 14.

In operation, the control computer 16 estimates the quantity of fuel supplied to the engine 14 by the fuel injectors 18. The quantity of fuel injected is estimated using a fuel quantity mathematical model. The fuel quantity mathematical model is designed according to the particular application and may vary according to such aspects of the application as the desired output, particular components of the application, and available inputs. The mathematical model includes a number of inputs and at least one output. The model inputs may include such inputs as signals received from sensors, signals produced by other circuitry, estimated operating parameters, and the like. One illustrative mathematical model for estimating the quantity of injected fuel is:

$$\text{Fuel Injected} = a + (b * \text{Pressure}) + (c * \text{Ontime}) * \sqrt{\text{Pressure}}$$

where Fuel Injected is an output of the mathematical model indicative of the estimated quantity of fuel supplied to the engine 14 by the injectors 18; Pressure is an input indicative of the pressure of the fuel collection unit 20; Ontime is an input indicative of the time period during which the injectors 18 are injecting fuel; and a, b, c are model parameter values. It should be understood that the above-identified fuel quantity estimation mathematical model is just one example of a fuel quantity estimation mathematical model and that other fuel quantity estimation mathematical models may be used. Additionally, other types of mathematical models may be designed and used in other applications and the present disclosure should not construed as limited to fuel quantity estimation mathematical models, but instead should be considered to include any application in which parameter values of a mathematical model are to be estimated online.

The fuel quantity estimation logic circuit 34 utilizes the mathematical model to produce an output signal indicative of the estimated injected fuel quantity at the output EO. The model parameters are updated by the parameter estimation logic circuit 36 to improve the accuracy of the estimated output. For example, the fuel injector control logic circuit 32 may alter the injector on-time signals produced at the outputs OT1 through OTn of the logic circuit 32 based on the input signals received at the inputs IN1 through INn. Consequently, the input signals received at the OT1 through OTn inputs of the fuel quantity estimation logic circuit 34 will vary according to the outputs of the fuel injector control logic circuit 32. Additionally, the pressure input signal received at the input P of logic circuit 36 may vary according to the pressure of the fuel collection until 20 sensed by sensor 24. Accordingly, the fuel quantity estimation logic circuit 34 receives updated estimated parameter values from the parameter estimation logic circuit 36 via signal paths 56. The model parameters are estimated and updated online by the parameter estimation logic circuit 36 based on past and present model input and output values using an estimation algorithm stored, for example, in memory device 48.

Figure 2A:
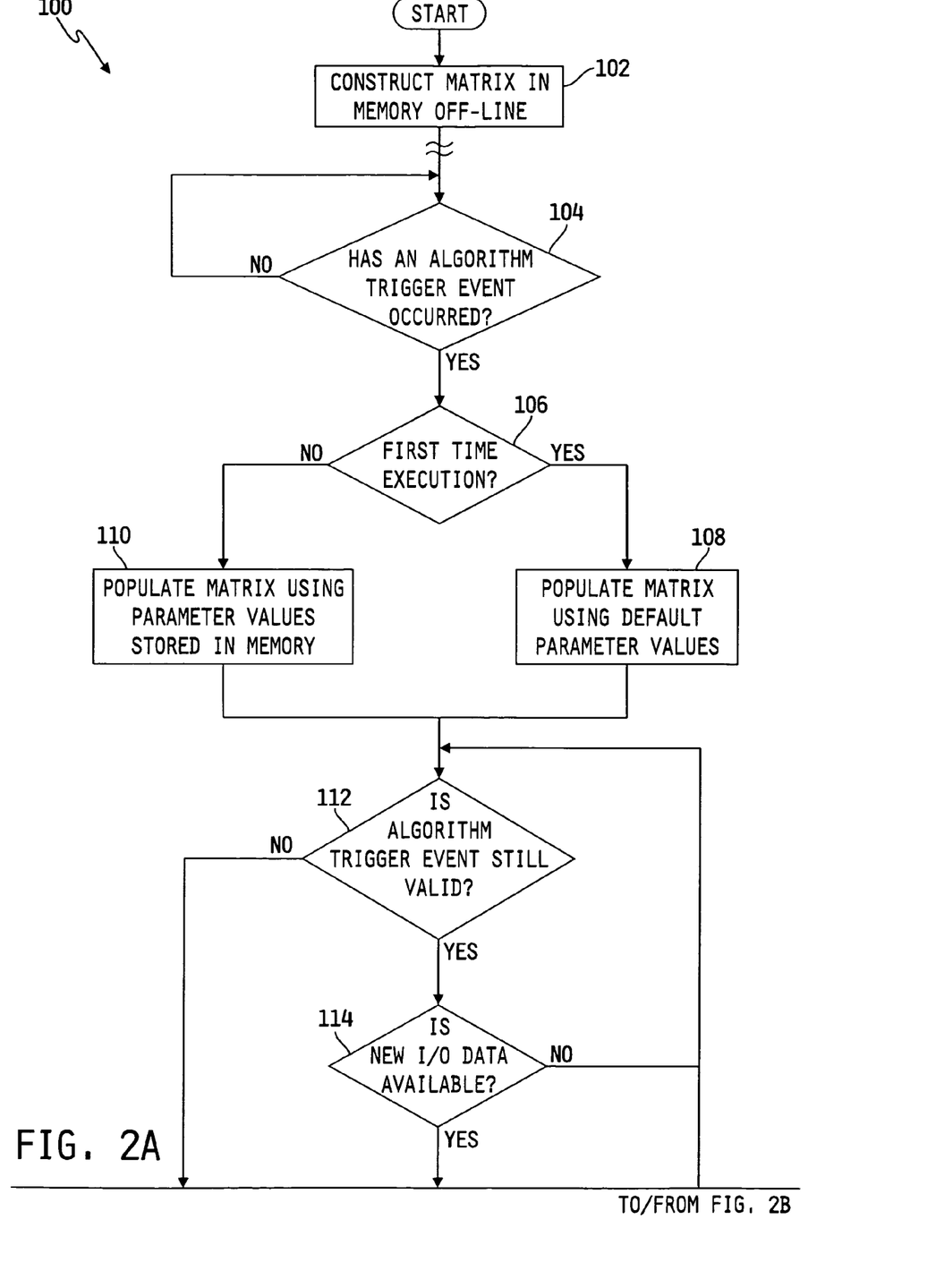
FIG. 2A–2B is a flowchart illustrating one embodiment of an algorithm for estimating a set of mathematical model parameters on-line used by the system of FIG. 1.
Figure 2B:
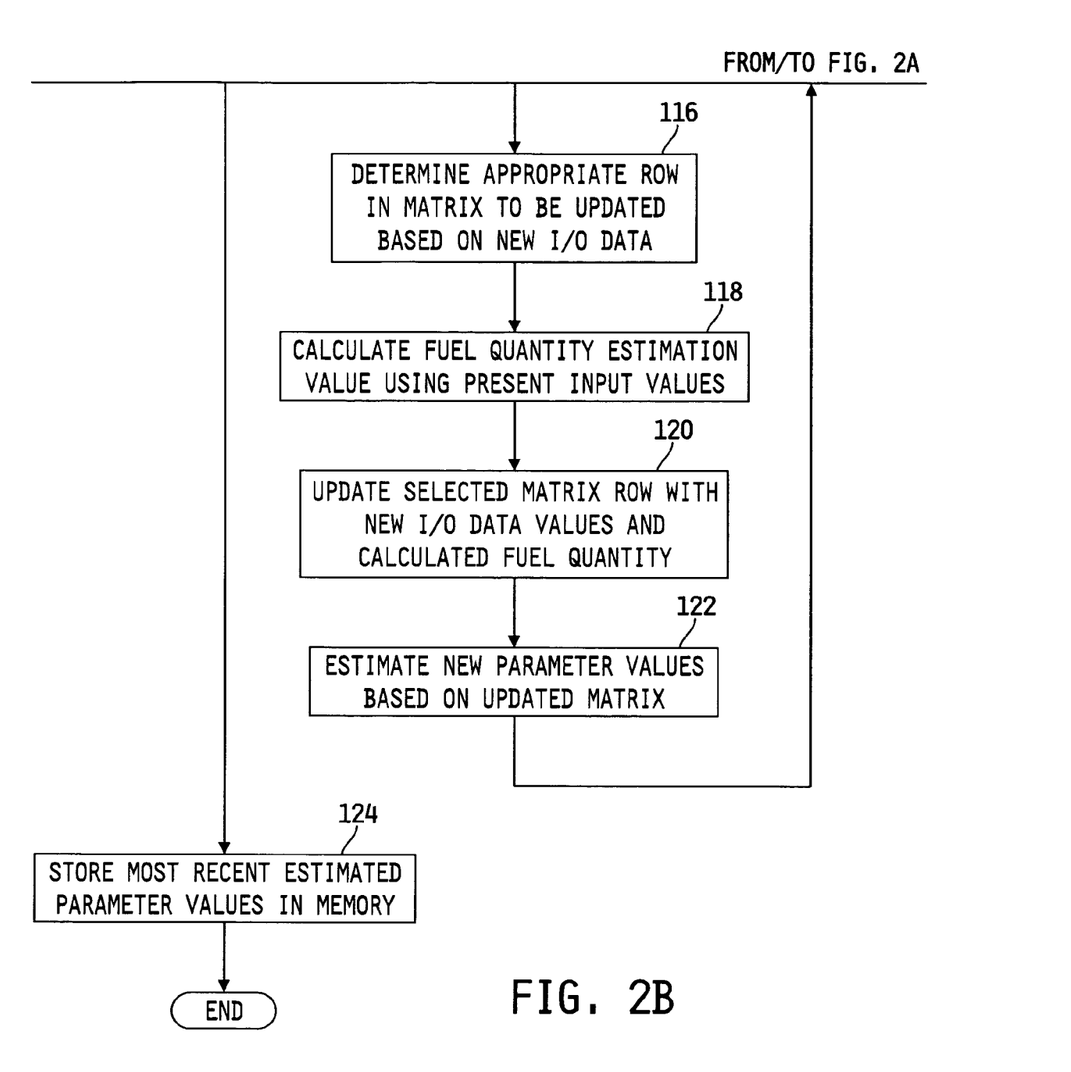
Figure 3:
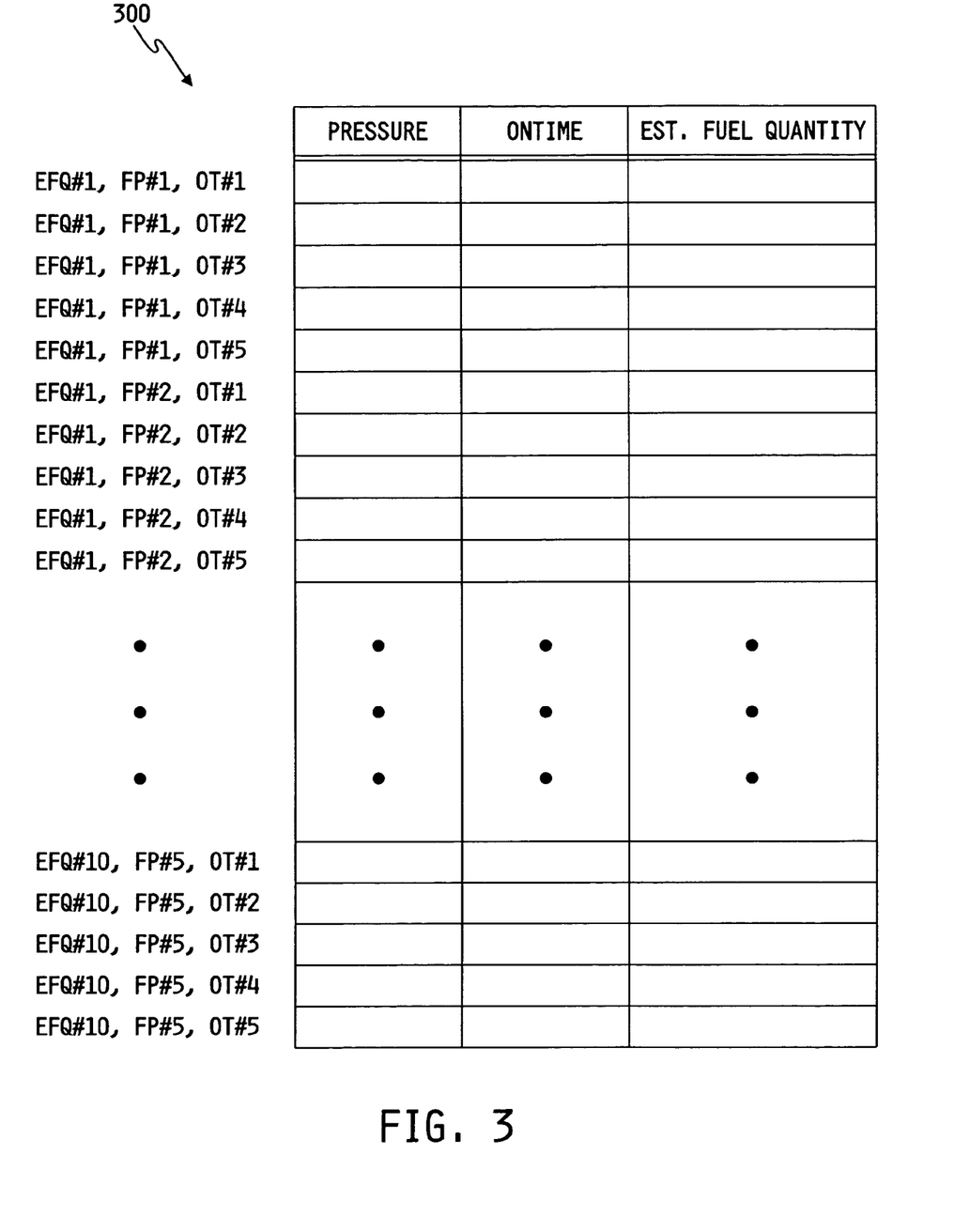
FIG. 3 is a diagrammatic illustration of one embodiment of a data matrix used by the algorithm illustrated in FIG. 2.

Referring now to FIG. 2, an algorithm 100 for estimating a set of mathematical model parameters is shown. A data matrix is constructed in a memory location, for example in memory device 48, in process step 102. Typically, the data matrix is constructed off-line (i.e. during a time period in which the system 10 is not operating or in which the system 10 is not currently estimating the fuel quantity injected by the injectors 18). An illustrative data matrix 130 is shown in FIG. 3. The data matrix 130 is constructed by selecting an x number of operating conditions of interest. The number and type of operating conditions selected may be based on the particular application. For example, the data matrix 130 uses Estimated Fuel Quantity (EFQ), Fuel Pressure (FP), and On-Time (OT) operating conditions. The operating conditions are each divided into a number of distinct ranges (e.g. EFQ may be divided into $r_1$ ranges, FP may be divided into $r_2$ of ranges, and OT may be divided into $r_3$ ranges). The number of ranges into which each individual operating condition (i.e. EFQ, FP, and OT) is divided may be selected based on a number of criteria including, for example, the expected data value range of the operating condition, particular operating ranges of interest, desired granularity of ranges, and the like. In the illustrative embodiment of FIG. 3, the Estimated Fuel Quantity operating condition has been divided into 10 ranges, the Fuel Pressure operating condition has been divided into 5 ranges, and the On-Time operating condition has been divided into 5 ranges. It should be understood, however, that in other applications and implementations other ranges and operating conditions may be used including, for example, engine speed, crank shaft displacement, engine temperature, and the like.

Each row of the data matrix 130 represents individual combinations of the operating ranges. For example, Estimated Fuel Quantity range 1, Fuel Pressure range 1, and On-Time range 1 is represented by the first row of the data matrix 130; Estimated Fuel Quantity range 1, Fuel Pressure range 1, and On-Time range 2 is represented by the second row of the data matrix 130; and so on. Only a selection of the number of rows is shown in FIG. 1 for brevity, but data matrix 130 may include any number of rows based on the number of distinct range combinations. The total number of rows of the data matrix 130 may be determined by the following equation:

$$M = \prod_{X=1\ldots n} r_x$$

where M is the total number of rows and $r_x$ is the number of ranges in which the $x$ operating condition is divided.

Each column of data matrix 130 represents one of the input(s) or output(s) of the mathematical model. For example, as shown in FIG. 3, the data matrix 130 includes three columns, i.e. an input Pressure column, an input On-time column, and an output Estimated Fuel Quantity column. The data matrix 130 is an M by N+K matrix, where M is the total number of rows formed by the range combinations of the operating conditions, N is the number of inputs of the mathematical model, and K is the number of outputs of the mathematical model. Although the illustrative data matrix 130 is constructed with the matrix rows representing the number of operating condition ranges and the matrix columns representing the model input(s) and output (s), it is contemplated that in other applications or implementations that the data matrix 130 may be constructed with the matrix rows representing the model input(s) and output (s) and the matrix columns representing the operating condition ranges, i.e. a N+K by M matrix. Additionally, while algorithm 100 is described below using an illustrative M by N+K data matrix configuration, other data matrix configurations may be used. Accordingly, the present disclosure should not be construed to be restricted to any particular data matrix configuration, but should be considered to encompass other data matrix configurations including, but not limited to, an N+K by M data matrix.

After the data matrix 130 has been constructed in memory with the selected operating ranges, model input(s), and model output(s), the algorithm 100 determines if a trigger event has occurred in process step 104. The trigger event may be generated internally to the control computer 16 from, for example, another circuit or sub-circuit or may be generated externally to the control computer 16. For example, the trigger event may be the receipt of an "engine start" signal, such as a signal generated by the key switch 30, at the trigger input TI of the parameter estimation logic circuit 36. In other applications, the trigger event may include the receipt of a trigger signal, such as a signal generated by one of the engine sensors (e.g., 28), at the trigger input TI. Additionally, the trigger event may be based on the value of the signal received at the TI input. For example, the trigger event may be defined as the time period in which the engine speed signal is above some predetermined threshold data value or within a predetermined data window. If a trigger event has not occurred, the algorithm 100 continues to monitor the trigger input TI for a trigger event.

Once a trigger event has been received by the parameter estimation logic circuit 36, the algorithm 100 determines if the present algorithm execution is the first execution of the algorithm 100 in process step 106. Whether the present execution is the first execution may be determined by one of a number of methods including, for example, analyzing the data presently stored in the data matrix 130, storing and analyzing an execution counter value, or the like. If the present execution is the first execution of the algorithm 100, the algorithm populates the matrix cells of the data matrix 130 with default values in process step 108. For example, matrix cells of the data matrix 130 representing input(s) of the mathematical model (i.e. data matrix belonging to a column representing an input of the mathematical model) are populated with default input data values which fall within the input operating condition ranges represented by the matrix row associated with the matrix cell. If a mathematical model input is not represented as one of the operating conditions and, consequently, no operating condition range for the model input has been established, predetermined default input data values may be used. The matrix cells of the data matrix 130 representing the output(s) of the mathematical model (i.e. matrix cells belonging to a column representing an output of the mathematical model) are populated with the output of the mathematical model calculated using default parameter values and the input values belonging to the same operating condition range and, therefore, stored in the matrix cells of the matrix row in which the present output matrix cell belongs. The default parameter values may be predetermined default parameter values, "best guess" values, or the like.

If the present execution is not the first execution of the algorithm 100, the algorithm 100 populates the input matrix cells of the data matrix 130 with parameter values stored in memory using a method similar to the method described above in regard to process step 108. The algorithm 100 retrieves the stored values of the mathematical model parameters from a memory storage location, for example, from memory device 48. The algorithm 100 populates the output matrix cells of the data matrix 130 with the output of the mathematical model calculated using the parameter values retrieved form memory and the input values belonging to the same operating condition range and, therefore, stored in the matrix cells of the matrix row in which the present output matrix cell belongs.

Once the data matrix 130 has been populated via process step 108 or process step 110, the algorithm 100 determines if the trigger event is still valid in process step 112. For example, the algorithm may determine if an ignition signal is still being received at the TI input of the parameter estimation logic circuit 36, if an engine operating condition signal received at the TI input is still above a predetermined data threshold or within a predetermined data window, or the like. If the trigger event is no longer valid, the algorithm 100 stores the most recent estimated mathematical model parameter values in a non-volatile memory storage location, for example in the memory device 48, in process step 124 and the execution of the algorithm 100 ends.

If the trigger event is still valid, the algorithm 100 determines if there are any new input and/or output data values available in process step 114. The algorithm 100 may determine the availability of new input data values based on such criteria as a change in the input values received at the data inputs (i.e. OT1 though OTn and P) of the fuel quantity estimation logic circuit 34, a change in the input values received at the inputs of the circuit 34 which is greater than a predetermined threshold value, a lapse of a predetermined amount of time, or the like. The algorithm 100 may determine the availability of new output data values based on such criteria as a change in the input values, a change in the estimated parameter values, or the like. If no new input and/or output data values are available, the algorithm 100 loops back to process step 112.

If new input and/or output data values are available, the algorithm 100 determines at step 116 the appropriate matrix row in the data matrix 130 to be updated. The appropriate matrix row may be determined by inspecting the present operating conditions of the system 10 and selecting a matrix row representing a combination of operating condition ranges in which the present operating conditions belong. In some embodiments, the inspected operating conditions (i.e. those operating conditions included in the combinations which form the matrix rows of the data matrix 130) include only those operating conditions used by the mathematical model as model inputs. In other embodiments, the inspected operating conditions may also include operating conditions not represented in the mathematical model as model inputs, but instead, include operating conditions monitored by a sensor or sensors producing signals indicative of the operating condition which are received by the parameter estimation logic circuit 36 at appropriate input terminals.

The fuel quantity injected into engine 14 by the fuel injectors 18 is estimated in process step 118. The fuel quantity is estimated using the present model input values and model parameters. The fuel quantity estimation logic circuit 34 performs the estimation calculation using the predetermined fuel quantity mathematical model. The logic circuit 34 transmits the estimated fuel quantity value to the parameter estimation logic circuit 36 and produces the estimated fuel quantity value at the output EO for use by other circuits internal and/or external to the control computer 16. In other embodiments, the parameter estimation logic circuit 36 may calculate the estimated fuel quantity value independent of the fuel quantity estimation performed by the fuel quantity estimation logic circuit 34.

After the fuel quantity has been estimated using the presently available model input values and parameter values, the data matrix 130 is updated in process step 120. In particular, the data matrix row selected in process step 116 is updated with the present mathematical model input values and the estimated fuel quantity value calculated in process step 118 (i.e. the old input and output values stored in data matrix 130 are replaced with the newly available input and calculated output values). Alternatively, in those embodiments including a N+K by M data matrix 130, the data matrix column selected in process step 116 is updated with the presently available model input and calculated output values.

New mathematical model parameter values are estimated in process step 122. The parameter values may be estimated using the complete data matrix 130 and one or more of a number of estimation methods commonly known to those of ordinary skill in the art. For example, in the embodiment illustrated in FIGS. 1–3, the parameter values are estimated using the complete data matrix 130 and a non-recursive least squares regression algorithm. However, other estimation methods may be used including, but not limited to, a recursive least squares regression algorithm or other known regression algorithms.

After new mathematical model parameter values have been estimated, the parameter values may be transmitted to the fuel quantity estimation logic circuit 34 for use in the calculation of the estimated fuel quantity. The algorithm 100 loops to process step 112 and the process steps 112 through 122 are repeated using the newly estimated parameter values until the trigger event is no longer valid. If the trigger event is determined to no longer be valid, the algorithm 100 stores the presently estimated parameter values as described above in regard to process step 124 and ends execution.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the system for estimating online a set of mathematical model parameters is described herein using an illustrative fuel quantity mathematical model, other fuel quantity mathematical models having alternative input(s) and/or output(s) may be used. Additionally, other types of mathematical models may be used including, but not limited to, Exhuast Gas Recirculation (EGR) control models, Variable Geometry Turbocharger (VGT) control models, and fuel pressure control models, as well as other non-engine related model-based systems. Accordingly, the present disclosure should not be construed as restricted to fuel quantity mathematical models, or to mathematical models for controlling or simulating operations of an internal combustion engine.

What is claimed is:

1. A system for estimating a set of mathematical model parameters, the system comprising:
at least one sensor configured to produce sensory data; and
a control circuit producing at least one control parameter, the control circuit maintaining a mathematical model as a function of a number of system operating conditions including either of the sensory data produced by the at least one sensor and the at least one control parameter as well as the set of mathematical model parameters, the control circuit responsive to the number of system operating conditions to periodically update a group of matrix cells of a data matrix, and to estimate the set of mathematical model parameters based on the updated data matrix.

2. The system of claim 1, wherein the control circuit includes a memory device having stored therein the data matrix.

3. The system of claim 1, wherein the control circuit includes a memory device, the control circuit configured to store the estimated set of mathematical model parameters in the memory device.

4. The system of claim 1, further including an input terminal receiving a trigger signal indicative of a trigger event, the control circuit responsive to the trigger signal to populate the data matrix with default values.

5. The system of claim 4, wherein the default values include output values of the mathematical model calculated using default parameter values.

6. The system of claim 4, wherein the trigger signal includes an ignition signal from a vehicle key switch.

7. The system of claim 4, wherein the trigger signal includes a data signal received from an engine sensor.

8. The system of claim 1, further including an input terminal receiving a trigger signal indicative of a trigger event, the control circuit responsive to the trigger signal to retrieve saved mathematical model parameter values from a memory location and populate the data matrix with output values of the mathematical model, the output values calculated using the retrieved mathematical model parameter values.

9. The system of claim 8, wherein the trigger signal includes an engine start signal from a vehicle key switch.

10. The system of claim 8, wherein the trigger signal includes a signal received from an engine sensor.

11. The system of claim 1, further including an input terminal receiving a trigger signal indicative of a trigger event, the control circuit configured to determine the number of trigger signals received and populate the matrix based on the number of trigger signals.

12. The system of claim 11, wherein the trigger signal includes an engine start signal from a vehicle key switch.

13. The system of claim 11, wherein the trigger signal includes a signal received from an engine sensor.

14. The system of claim 1, wherein the at least one sensor configured to produce sensory data includes a fuel collection unit pressure sensor configured to produce a pressure signal indicative of a pressure of a fuel collection unit.

15. The system of claim 1, wherein the at least one control parameter includes a fuel injector on-time value.

16. The system of claim 1, wherein the control circuit includes a control circuit configured to calculate an output value of the mathematical model based on the number of system operating conditions and update the data matrix with the output value in response to receiving the number of system operating conditions.

17. The system of claim 1, wherein the control circuit includes a control circuit periodically updating a row of a data matrix in response to receiving the number of system operating conditions, the control circuit configured to determine the row of the data matrix based on the values of at least a portion of the number of system operating conditions.

18. The system of claim 1, wherein the control circuit includes a control circuit periodically updating a column of a data matrix in response to receiving the number of system operating conditions, the control circuit configured to determine the column of the data matrix based on the values of at least a portion of the number of system operating conditions.

19. The system of claim 1, wherein the data matrix includes an M by N+K data matrix wherein M represents a number of operating condition ranges, N represents a number of mathematical model inputs, and K represents a number of mathematical model outputs.

20. The system of claim 1, wherein the data matrix includes an M+K by N data matrix wherein M represents a number of mathematical model inputs, K represents a number of mathematical model outputs, and N represents a number of operating condition ranges.

21. The system of claim 1, wherein the data matrix includes a data matrix wherein each data matrix row is a representation of a range of operating conditions and each data matrix column is a representation of one of an input and output of the mathematical model, the control circuit configured to determine the data matrix row by selecting a row of the data matrix representing an operating condition range including values of at least a portion of the number of system operating conditions.

22. The system of claim 1, wherein the data matrix includes a data matrix wherein each data matrix column is a representation of a range of operating conditions and each data matrix row is a representation of one of an input and output of the mathematical model, the control circuit configured to determine the data matrix column by selecting a column of the data matrix representing an operating condition range including values of at least a portion of the number of system operating conditions.

23. The system of claim 1, wherein the control circuit includes a control circuit configured to estimate the set of mathematical model parameters based on the updated data matrix using a regression algorithm.

24. The system of claim 23, wherein the regression algorithm includes a least squares regression algorithm.

25. The system of claim 1, wherein the mathematical model is a fuel quantity estimation mathematical model.

26. A method for estimating a set of mathematical model parameters for a mathematical model of a system operating parameter, the method comprising the steps of:

determining a number of system operating conditions including sensory data produced by at least one sensor;

selecting a group of matrix cells of a data matrix based on values of the number of system operating conditions;

updating the selected group of matrix cells of the data matrix based on values of the number of system operating conditions; and estimating the set of mathematical model parameters based on the updated data matrix.

27. The method of claim 26, further comprising calculating an output value of the mathematical model based on values of the number of system operating conditions.

28. The method of claim 27, wherein the updating step includes updating the selected group of matrix cells of the data matrix with the output value.

29. The method of claim 26, further comprising constructing the data matrix in a memory location.

30. The method of claim 29, wherein the constructing step includes constructing an M by N+K data matrix wherein M represents a number of operating condition ranges, N represents a number of mathematical model inputs, and K represents a number of mathematical model outputs.

31. The method of claim 29, wherein the constructing step includes constructing a M+K by N data matrix wherein M represents a number of mathematical model inputs, K represents a number of mathematical model outputs, and N represents a number of operating condition ranges.

32. The method of claim 26, further comprising populating the data matrix with default data values prior to the determining step.

33. The method of claim 32, wherein the populating step includes populating the data matrix with an output value of the mathematical model calculated using a set of default mathematical model parameters.

34. The method of claim 26, further comprising retrieving a set of stored parameter values from a memory location prior to the receiving step.

35. The method of claim 34, further comprising populating the data matrix with default data values subsequent to the retrieving step and prior to the receiving step.

36. The method of claim 35, wherein the populating step includes populating the data matrix with output values of the mathematical model calculated using the set of stored parameter values.

37. The method of claim 34, further comprising populating the data matrix with output values of the mathematical model calculated using the set of stored parameter values if a present execution of the method is a first execution of the method and populating the data matrix with default output values otherwise.

38. The method of claim 26, further comprising storing the set of estimated mathematical model parameters in a memory location after the determining step.

39. The method of claim 26, wherein the determining step includes receiving pressure data from a fuel collection unit pressure sensor configured to produce a pressure signal indicative of a pressure of a fuel collection unit.

40. The method of claim 26, wherein the determining step includes determining a fuel injector on-time value.

41. The method of claim 26, wherein selecting a group of matrix cells of a data matrix includes selecting a row of the data matrix.

42. The method of claim 26, wherein the selecting step includes selecting a row of the data matrix representing an operating condition range, the operating condition range including values of at least a portion of the number of system operating conditions.

43. The method of claim 26, wherein selecting a group of matrix cells of a data matrix includes selecting a column of the data matrix.

44. The method of claim 26, wherein the selecting step includes selecting a column of the data matrix representing an operating condition range, the operating condition range including values of at least a portion of the number of system operating conditions.

45. The method of claim 26, wherein the estimating step includes determining the set of mathematical model parameters based on the updated data matrix using a least square regression algorithm.

46. A method for estimating a set of mathematical model parameters of a fuel quantity estimation model, the method comprising the steps of:

receiving sensory data from a number of data sensors;

selecting a row of a data matrix based on values of the sensory data in response to the receiving step;

updating the selected row of the data matrix based on the sensory data; and estimating the set of mathematical model parameters based on the updated data matrix using a least squares regression algorithm.

* * * * *